Figure 1:
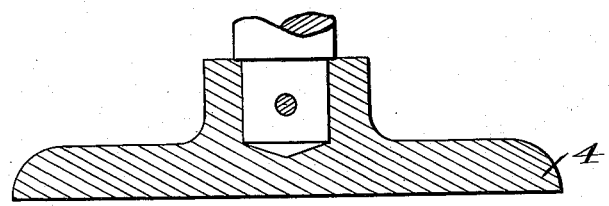

W. BAUSCH.
METHOD OF MAKING BIFOCAL LENSES.
APPLICATION FILED SEPT. 6, 1907.

930,826. Patented Aug. 10, 1909.

Inventor
William Bausch

Witnesses
By
his Attorneys

UNITED STATES PATENT OFFICE.

WILLIAM BAUSCH, OF ROCHESTER, NEW YORK, ASSIGNOR, BY MESNE ASSIGNMENTS, TO BAUSCH & LOMB OPTICAL COMPANY, OF ROCHESTER, NEW YORK, A CORPORATION OF NEW YORK, (NO. 2.)

METHOD OF MAKING BIFOCAL LENSES.

No. 930,826.            Specification of Letters Patent.            Patented Aug. 10, 1909.

Application filed September 6, 1907. Serial No. 391,574.

*To all whom it may concern:*

Be it known that I, WILLIAM BAUSCH, of Rochester, in the county of Monroe and State of New York, have invented certain new and useful Improvements in Methods of Making Bifocal Lenses; and I do hereby declare the following to be a full, clear, and exact description of the same, reference being had to the accompanying drawings, forming a part of the specification, and to the reference-numerals marked thereon.

My present invention relates to the manufacture of lenses embodying two or more parts or members composed of glass of different refractive index and consists in an improved method whereby only one of the members is required to be ground and polished, and this the male or positive member which is the one that may be subjected to these operations with the least expense.

Bifocal lenses for spectacles and eyeglasses as usually constructed, embody a major lens formed of glass of one refractive index, relatively low, such as crown glass adapted for distant vision and a minor lens of flint glass of relatively higher refractive index adapted for near vision, smaller than the former and secured within its periphery near the lower edge by cement or some securing medium, both faces of both the major and minor lens being previously ground and polished and their proximate faces being accurately fitted to each other, usually by grinding and polishing a concavity in the face of the major lens of exactly the curve of the corresponding face of the minor lens. Naturally, accurate work is required in making such lenses and their cost is relatively high. Furthermore, the balsam or cement used in securing the parts together is liable to become discolored and to vary in density and refractive power, and to crack or lose its adhesive power, owing to differences in the coefficient of expansion of glass of different composition, thereby rendering the lenses worthless for the purposes of vision until properly repaired. All these objections in manufacture and efficiency are overcome by my invention and my lenses may be made cheaply and will always remain the same.

In the manufacture of bifocal spectacle and eyeglass lenses, it is first necessary to determine the kinds of glass to be employed for the major and minor lenses and the curves on which the faces are to be ground to produce the optical effect desired, and in carrying out my invention after this is determined I first grind the inner face or surface of the minor lens to the required curve and polish it, or if desired both surfaces thereof may be ground and polished. I then take a piece of glass selected for the major lens and having a lower refractive index, such as crown glass, and heat it until its body becomes more or less plastic and its surface is practically fused, and after also heating the minor lens slightly to prevent cracking but, so that its surface conformation will not be changed by pressure, I place the minor lens upon the former with its curved face down and force it down into the glass for the major lens embedding its lower surface in the latter and causing the two to become firmly united and practically integral. This lower ground and polished face of the minor lens therefore displaces the glass of the major lens and obviates the necessity heretofore existing of grinding a recess in the inner face of the major lens next the minor and polishing it. After the minor is thus embedded in the glass for the major lens, the only operation necessary is to grind and polish the outer faces of the latter in the usual manner on the proper curves to produce the optical effect desired. Of course the outer face of the minor lens may be ground and polished if desired on the curve it is to have in the finished article, and the whole lens may be roughly molded at the same time that the minor lens is pressed into it, so that only a small amount of material is required to be removed by grinding. One of the principal features of the invention however is that the manufacturer may make and sell to opticians the blanks for bifocal lenses having the minor lenses of different curves or powers and of different refractive indices embedded therein and the optician knowing the curve, index and position of the minor lens may then grind the outer faces of these blanks as required to produce the desired optical effect.

The minor lens for bifocal glasses is usually convex on the surface that is next to the major lens and it is therefore much easier to grind and polish than to grind and polish a depression in the major lens and as this rounded surface is pressed down into the face of the glass for the major lens and forms its own seat and is not heated sufficiently to lose its shape, the surface of the crown glass does not require finishing at all excepting perhaps to remove imperfections or dust from its surface.

I have found in practice that by subjecting the blank for the crown glass for a few minutes to a temperature of 1500 degrees Fahrenheit in a furnace heated by electricity, it is rendered sufficiently soft to enable the lens of flint glass to be pressed into its surface, form its own seat and become fused in position. The flint glass lens is not left in the furnace a sufficient length of time to become softened and lose its shape, but is merely warmed so that it will not crack nor separate from the other part. After being formed the complete lens is annealed in the usual manner.

Figure 2:
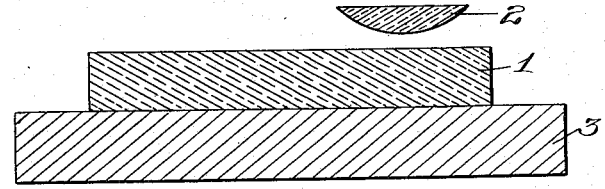
Figure 3:
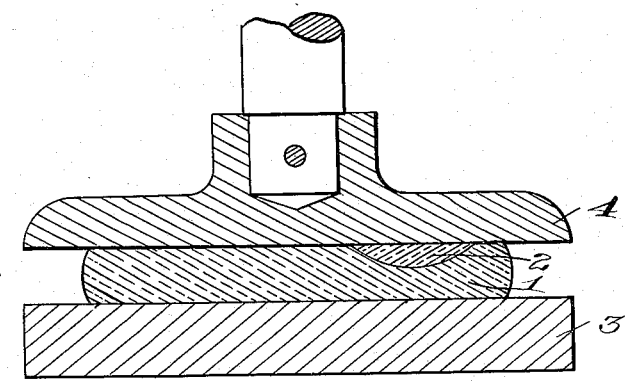

In the drawings: Figure 1 is a sectional view of the press and the blanks for the major lens and the minor lens separated. Fig. 2 is a similar view after the minor lens has been embedded or pressed into the blank for the major lens and Fig. 3 is a similar view of a complete lens.

The blank for the major lens is indicated by 1, the minor lens by 2, and the complete bifocal lens, ground and polished, by 12. The only apparatus necessary for carrying out the method is a suitable furnace for heating the blanks and a suitable press for embedding the minor lens in the blank for the major, embodying a bed 3 and a relatively movable platen 4, indicated in Fig. 1.

It is impracticable to give the temperatures to which the parts should be heated owing to the difficulty in determining exact temperatures and to the character of the glass employed, but I have found those given above as sufficient, but it is essential that the formed lens (preferably the minor lens) should not be heated sufficiently to cause it to change its shape when the two are pressed together, though it must be sufficiently heated to cause the parts to properly unite.

By the use of the term adhesive as descriptive of the condition of the glass for the major lens blank, it is not intended that this surface is necessarily flowing or "tacky" to such an extent that the minor lens will at once stick to it when placed thereon and without pressure, as the proper adhesion or connection of the parts is obtained by pressure, even when the crown glass is hard enough to permit the minor lens to rock on its rounded face when first applied, and as well when the surface is "tacky". Of course compound lenses other than spectacle lenses could be formed in this same way if desired.

I claim as my invention:

1. The method of forming blanks for bifocal lenses embodying two pieces of glass of different refractive indices, consisting in grinding and polishing one surface of one piece to form a positive lens, heating the other piece of glass sufficiently to render it plastic and its surface adhesive and then pressing the convex surface of the positive lens into the surface of the last mentioned piece of glass while it is plastic, causing it to form a correspondingly shaped recess therein and the two to become fused together.

2. The method of forming blanks for bifocal lenses embodying two pieces of glass of different refractive indices, consisting in grinding and polishing one surface of one piece to form a positive lens surface, warming the lens thus formed, heating the other piece of glass sufficiently to render it plastic and its surface adhesive, pressing the ground and polished surface of the lens into the last mentioned piece while it is plastic to form a correspondingly shaped recess therein and cause the two to adhere.

3. The method of forming bifocal lenses embodying a major and a minor lens composed of glass of different refractive indices, consisting in grinding and polishing the convex surface of the minor lens, then warming it, heating the glass for the major lens to render it plastic and its surface adhesive, pressing the convex surface of the minor lens into the surface of the glass for the major lens and grinding and polishing the surfaces of the major lens and the outer or exposed surface of the minor lens to the desired curvatures.

4. The method of forming lenses of two pieces of glass having different refractive indices, consisting in grinding and polishing the surface of one piece to form a convex lens surface, heating the other piece until it is plastic, then forcing the ground and polished surface of the former lens into the body of the latter and finally gradually cooling the lens thus formed.

WILLIAM BAUSCH.

Witnesses:
H. C. THON,
W. G. WOODWORTH.